United States Patent
Matikainen et al.

(10) Patent No.: US 11,209,720 B1
(45) Date of Patent: Dec. 28, 2021

(54) CAMERA MODULE AND ELECTRONIC DEVICE HAVING IMAGE-CAPTURING FUNCTION

(71) Applicant: AAC Optics Solutions Pte. Ltd., Singapore (SG)

(72) Inventors: Jarno Matikainen, Tampere (FI); Tomi Lintulahti, Tampere (FI)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 17/005,358

(22) Filed: Aug. 28, 2020

(30) Foreign Application Priority Data

Jun. 30, 2020 (CN) .......................... 202010624371.2

(51) Int. Cl.
| | | |
|---|---|---|
| *G03B 17/12* | (2021.01) | |
| *G02B 7/08* | (2021.01) | |
| *G03B 3/02* | (2021.01) | |
| *G03B 17/56* | (2021.01) | |

(52) U.S. Cl.
CPC ............... *G03B 17/12* (2013.01); *G02B 7/08* (2013.01); *G03B 3/02* (2013.01); *G03B 17/565* (2013.01); *G03B 2217/244* (2013.01)

(58) Field of Classification Search
CPC .................................................... E05B 47/004
See application file for complete search history.

(56) References Cited

U.S. PATENT DOCUMENTS

| | | | | |
|---|---|---|---|---|
| 4,571,026 A | * | 2/1986 | Maruta .................... | G02B 7/08 359/814 |
| 5,056,902 A | * | 10/1991 | Chinnock .............. | A61B 34/73 359/503 |
| 5,490,015 A | * | 2/1996 | Umeyama ................ | G02B 7/08 359/813 |
| 5,822,622 A | * | 10/1998 | Inoue ..................... | G03B 17/08 396/27 |
| 7,066,663 B2 | * | 6/2006 | Cheng .................... | G03B 17/08 348/373 |
| 7,125,378 B2 | * | 10/2006 | Shimizu ............. | A61B 1/00188 600/112 |
| 7,961,414 B2 | * | 6/2011 | Matsuki ............ | G02B 23/2438 359/824 |
| 8,244,118 B2 | * | 8/2012 | Stansbury .............. | G03B 17/08 396/25 |

(Continued)

*Primary Examiner* — Clayton E. LaBalle
*Assistant Examiner* — Leon W Rhodes, Jr.
(74) *Attorney, Agent, or Firm* — W&G Law Group

(57) ABSTRACT

Provided is a camera module, including: a lens group including a lens barrel and a camera lens; and a driver assembly configured to drive the camera lens to move and including a magnetic portion. The camera lens includes a magnetic matching portion. The magnetic portion and the magnetic matching portion are respectively located at two ends of a side wall of the lens barrel in a thickness direction, and are connectable to each other through magnetic attraction, in such a manner that the camera lens is driven by the driver assembly to move along the optical axis of the camera lens. In this way, the side wall of the lens barrel is free of a through hole, so that light is prevented from entering the lens barrel via the through hole, thereby prolonging the lifetime of the camera module and improving the image-capturing effect.

18 Claims, 2 Drawing Sheets

(56) References Cited

U.S. PATENT DOCUMENTS

| | | | |
|---|---|---|---|
| 8,343,042 B2* | 1/2013 | Leiner | A61B 1/00158 |
| | | | 600/167 |
| 2010/0098398 A1* | 4/2010 | Dobell | G03B 17/08 |
| | | | 396/144 |

* cited by examiner

CAMERA MODULE AND ELECTRONIC DEVICE HAVING IMAGE-CAPTURING FUNCTION

TECHNICAL FIELD

The present invention relates to the technical field of electronic devices, and in particular to a camera module and an electronic device having an image-capturing function.

BACKGROUND

The commonly used digital cameras, mobile phones having image-capturing functions, notebook computers, tablet computers and other handheld electronic devices generally include a camera module for image capturing. The camera module typically includes a driver assembly. During a process of image capturing, the driver assembly is configured to drive a camera lens to extend and telescope, so as to achieve zooming and improve the image-capturing effect.

SUMMARY

The present invention provides a camera module and an electronic device having an image-capturing function. The camera module can conveniently achieve zooming and can prevent light from entering the lens barrel.

In a first aspect, an embodiment of the present invention provides a camera module. The cameral module includes: a lens group including a lens barrel and a camera lens, at least part of the camera lens being arranged in the lens barrel; and a driver assembly configured to drive the camera lens to move along an optical axis of the camera lens. The driver assembly includes a magnetic portion, the camera lens includes a magnetic matching portion, and the magnetic portion and the magnetic matching portion are respectively located at two ends of a side wall of the lens barrel in a thickness direction. The magnetic portion and the magnetic matching portion are connectable to each other through magnetic attraction, in such a manner that the camera lens is driven by the driver assembly to move along the optical axis of the camera lens.

In the embodiment of the present invention, by providing the magnetic portion and the magnetic matching portion, the camera lens and the driver assembly can be connected by the magnetic attraction between the magnetic portion and the magnetic matching portion. After the connection, the camera lens can be driven by the driver assembly to move in the lens barrel during the movement of the driving assembly, thereby achieving zoom. In this embodiment, the connection structure between the camera lens and the driver assembly is simple, and it is unnecessary to provide a through hole on the side wall of the lens barrel, so that light is prevented from entering the lens barrel via the through hole, which would otherwise affect the normal operation of the camera lens. In this way, the lifetime of the camera module can be prolonged and the image-capturing effect can be improved.

In an embodiment, the side wall of the lens barrel is free of a through hole. By providing no through hole in the side wall of the lens barrel, light can be prevented from entering the lens barrel via the through hole, which would otherwise affect the normal operation of the camera lens. In this way, the lifetime of the camera module can be prolonged and the image-capturing effect can be improved.

In an embodiment, a portion of the side wall of the lens barrel located between the magnetic portion and the magnetic matching portion is made of a non-metallic material. In this embodiment, the non-metallic part of the lens barrel does not affect the magnetic attraction between the magnetic portion and the magnetic matching portion. That is, the magnetic portion and the magnetic matching portion can attract each other by having the side wall of the lens barrel arranged therebetween. In this way, the camera lens and the driver assembly are connected to each other.

In an embodiment, the portion of the side wall of the lens barrel located between the magnetic portion and the magnetic matching portion has a thickness ranging from 10 mm to 50 mm.

In an embodiment, each of the magnetic portion and the magnetic matching portion is a magnet, and an end of the magnetic portion close to the magnetic matching portion and an end of the magnetic matching portion close to the magnetic portion have opposite magnetic polarities.

In an embodiment, each of the magnetic portion and the magnetic matching portion is an electromagnet, and an end of the magnetic portion close to the magnetic matching portion and an end of the magnetic matching portion close to the magnetic portion have opposite magnetic polarities while being energized.

In an embodiment, the magnetic matching portion is made of a metal material and is capable of being attracted by the magnetic portion.

In an embodiment, along a radial direction of the lens barrel, a projection of the magnetic portion and a projection of the magnetic matching portion at least partially overlap with each other. In this embodiment, the magnetic attraction between the magnetic portion and the magnetic matching portion is large, which can improve the connection reliability between the camera lens and the driver assembly, thereby improving the accuracy and reliability of the camera module in zooming.

In an embodiment, the camera lens includes a lens and a holding portion configured to hold the lens, and at least a part of the holding portion is located in the lens barrel. The holding portion is made of a non-metallic material, and is movable in the lens barrel, and the magnetic matching portion is arranged on the holding portion.

In an embodiment, the driver assembly further includes a motor and a transmission portion, the transmission portion is configured to be connected to the camera lens, and the magnetic portion is installed on the camera lens. The motor is configured to drive the transmission portion to move along a direction parallel with the optical axis of the camera lens.

In an embodiment, the motor includes an output shaft, wherein an axial direction of the output shaft is parallel with the optical axis of the camera lens, the transmission portion and the output shaft are connected to each other through threads, and the output shaft is configured to, during rotation of the output shaft, drive the transmission portion to move along the direction parallel with the optical axis of the camera lens.

In a second aspect, an embodiment of the present invention provides an electronic device having an image-capturing function. The electronic device includes: a housing; and the camera module as described above. The camera module is installed in the housing.

It should be understood that the above general description and the following detailed description are only exemplary and do not limit the present invention.

REFERENCE SIGNS

Figure 1:
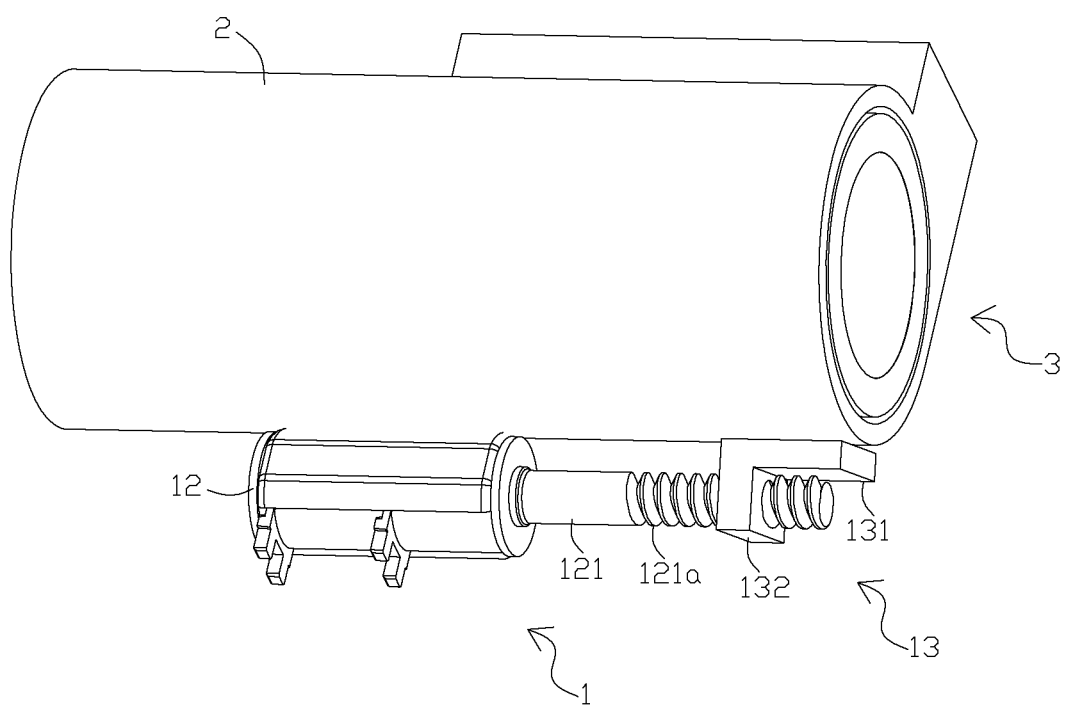
FIG. 1 is a structural schematic diagram of a camera module according to embodiments of the present invention.

1—driver assembly;
11—magnetic portion;
12—motor;
121—output shaft;
121a—external thread;
13—transmission portion;
131—first connection portion;
132—second connection portion;
14—magnetic matching portion;
2—lens barrel;
3—camera lens;
31—lens;
32—holding portion;
33—spacer;

The drawings herein are incorporated into and constitute a part of the present specification, for illustrating embodiments of the present invention and explaining principles of the present invention together with the specification.

DESCRIPTION OF EMBODIMENTS

In order to better understand technical solutions of the present invention, the embodiments of the present invention will be described in details with reference to the drawings.

It should be clear that the described embodiments are merely parts of, rather than, all of the embodiments of the present invention. Based on the embodiments described in the present invention, any other embodiments obtained by those skilled in the art without paying creative efforts shall fall within the protection scope of the present invention.

The terms used in the embodiments of the present invention are merely for the purpose of describing particular embodiments, but not intended to limit the present invention. Unless otherwise noted in the context, the expressions in singular form such as "a", "an", "the" and "said" used in the embodiments and appended claims of the present invention are also intended to include plural form.

It should be understood that the term "and/or" used herein is merely a term describing relations of the associated objects, indicating three possible relationships. For example, "A and/or B" indicates three cases, i.e., only A existing, both A and B existing, and only B existing. In addition, the character "/" used herein generally indicates that the associated objects have an "or" relationship therebetween.

It should be noted that, the expressions such as "upper", "lower", "left", "right" and the like mentioned in embodiments of the present invention are described with reference to the placement status in the accompanying drawings, and should not be construed as limitations to the embodiments of the present invention. In addition, it should also be understood that, in the context, when an element is described as being formed "above" or "below" another element, the element may be directly formed "above" or "below" the other element, or the element may be formed "above" or "below" the other element via an intermediate element.

The camera module in the related art usually includes a lens group and a driver assembly, the lens group includes a lens barrel and a camera lens located in the lens barrel, and the camera lens is driven to move along its optical axis to achieve zooming when capturing images. In order to drive the camera lens to move, a through hole is provided on a side wall of the lens barrel, and the driver assembly is extended into the lens barrel through the through hole to be connected to the camera lens. When the driver assembly moves, the camera lens can be driven to move. However, in the above solution, the driver assembly and the camera lens are connected to each other through the through hole provided in the side wall of the lens barrel, and there is a risk of light leakage through the through hole, thus there is a risk of affecting the optical characteristics of the camera lens and affecting the normal operation and image-capturing effect of the camera module.

Figure 2:
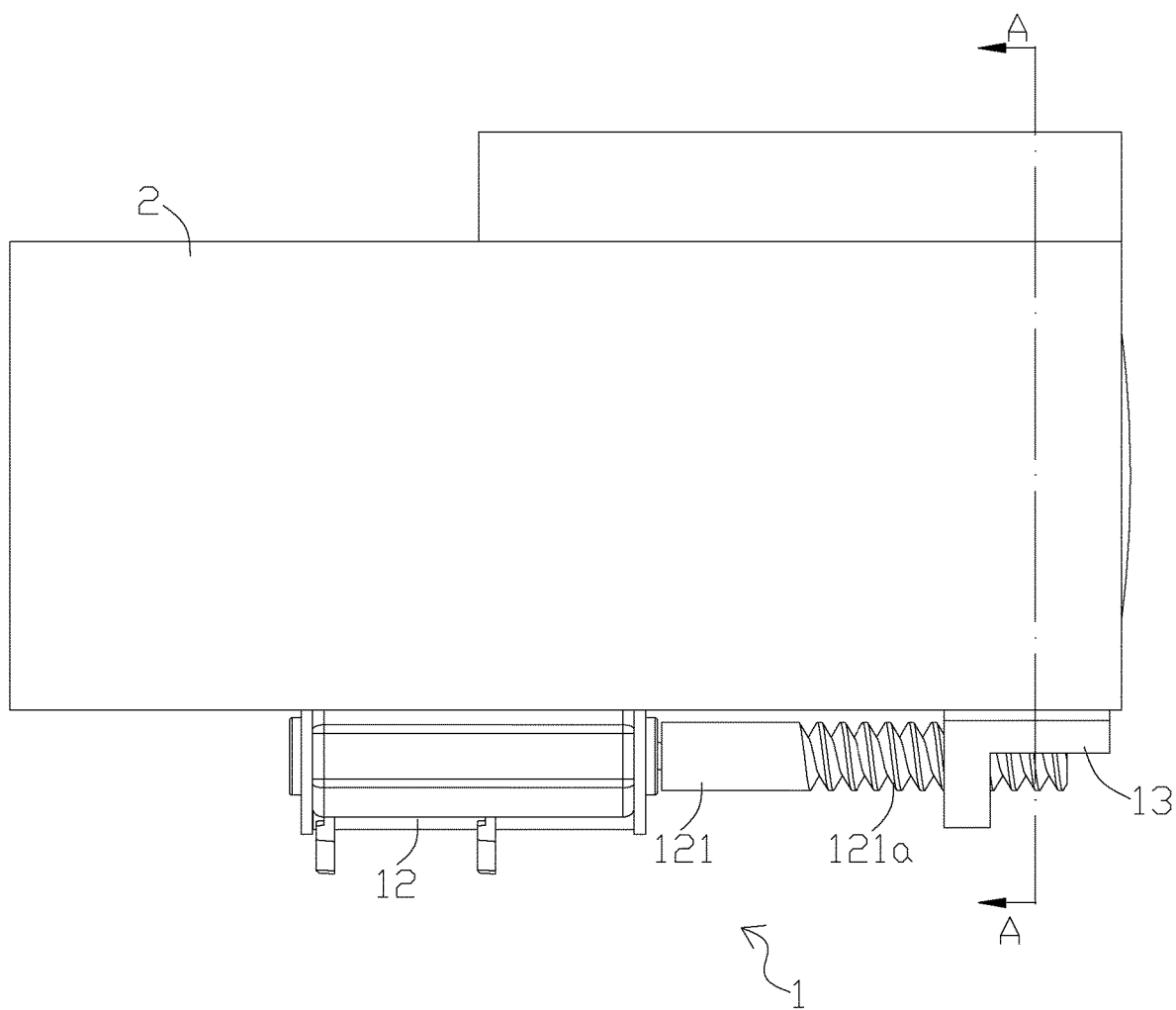
FIG. 2 is a front view of FIG. 1.
Figure 3:
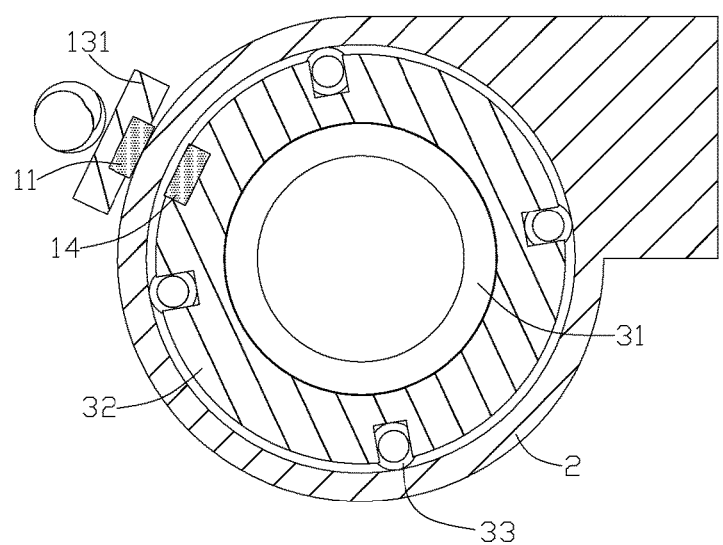
FIG. 3 is a cross-sectional view along line A-A of FIG. 2

In order to solve the technical problem described above, embodiments of the present invention provide a camera module as shown in FIGS. 1-3. The cameral module can be any electronic device having an image-capturing function, such as a cameral, a cellphone, a tablet personal computer, a desktop computer, a laptop computer, a handheld computer, a notebook computer, ultra-mobile personal computers (UMPC), netbooks, a cellular phone, a personal digital assistant (PDA), and an augmented reality (AR) device, a virtual reality (VR) device, an artificial intelligence (AI) device, a wearable device, a vehicle-mounted device, a smart home device, and/or a smart city device. The specific type of the electronic device is not particularly limited, as long as it includes a camera module.

As shown in FIGS. 1 and 2, the camera module includes a lens group and a driver assembly 1, the lens group includes a lens barrel 2 and a camera lens 3, and the camera lens 3 is arranged in an inner cavity of the lens barrel 2 and is movable in the inner cavity of the lens barrel 2. The driver assembly 1 is configured to drive the camera lens 3 to move along an optical axis of the camera lens 3, which is an optical axis of the lens 31 in the camera lens 3. The optical axis of the camera lens 3 refers to a line passing through a center of the camera lens 3.

As shown in FIG. 3, the driver assembly 1 includes a magnetic portion 11, and the camera lens 3 includes a magnetic matching portion 14. The magnetic portion 11 and the magnetic matching portion 14 are respectively located at two ends of a side wall of the lens barrel 2 in a thickness direction and can be connected to each other through magnetic attraction, in such a manner that the camera lens 3 can move along the optical axis of the camera lens 3 under the driving of the driver assembly 1.

In the embodiment of the present invention, by providing the magnetic portion 11 and the magnetic matching portion 14, the camera lens 3 and the driver assembly 1 can be connected by the magnetic attraction between the magnetic portion 11 and the magnetic matching portion 14. After the connection, the driver assembly 1 drives the camera lens 3 directly to move in the lens barrel 2 during the moving of the driver assembly 1, thereby achieving zooming. In this embodiment, the connection structure between the camera lens 3 and the driver assembly 1 is simple, and it is unnecessary to provide a through hole on the side wall of the lens barrel 2, so that light is prevented from entering the lens barrel 2 via the through hole, which would otherwise affect the normal operation of the camera lens 3. In this way, the lifetime of the camera module can be prolonged and the image-capturing effect can be improved.

According to the above embodiments, when the camera lens 3 and the driver assembly 1 are connected to each other through the magnetic attraction formed between the magnetic portion 11 and the magnetic matching portion 14, the magnetic portion 11 and the magnetic matching portion 14 do not need to be in direct contact with each other. Therefore, it is unnecessary to provide a through hole on the side wall of the lens barrel 2, which ensures an unbroken side wall of the lens barrel 2 and prevents light from entering the camera lens 3 in the lens barrel 2 via the through hole.

In an embodiment, along a radial direction of the lens barrel 2, i.e., a direction perpendicular to the optical axis of the camera lens 3, a part of the side wall of the lens barrel 2 located between the magnetic portion 11 and the magnetic matching portion 14 is made of a non-metallic material, e.g., a polymer material such as plastic.

In this embodiment, the non-metallic part of the lens barrel 2 does not affect the magnetic attraction between the magnetic portion 11 and the magnetic matching portion 14. That is, the magnetic portion 11 and the magnetic matching portion 14 can attract each other by having the side wall of the lens barrel 2 arranged therebetween. In this way, the camera lens 3 and the driver assembly 1 are connected to each other.

In an embodiment, all side walls of the lens barrel 2 can be made of a non-metallic material. At this time, the lens barrel 2 can be formed by one-piece injection molding or 3D printing, which has the advantage of convenient processing, and the lens barrel 2 of the non-metallic material has a small weight, which can reduce the overall weight of the camera module. In addition, in order to improve the overall strength of the camera module, the lens barrel 2 can be made of a material such as polyvinyl chloride (PVC).

In an embodiment, the side wall of the lens barrel 2, which is made of the non-metallic material, has a thickness ranging from 10 mm to 50 mm. For example, the thickness of the side wall made of the non-metallic material may be 20 mm, 30 mm, or the like.

In the embodiment, as shown in FIG. 3, the thickness of the side wall made of the non-metallic material of the lens barrel 2 should not be too large or too small. Since the magnetic portion 11 and the magnetic matching portion 14 may attract each other by having the side wall made of the non-metallic material arranged therebetween, if the thickness of the side wall made of the non-metallic material is too large, the magnetic attraction between the magnetic portion 11 and the magnetic matching portion 14 is relatively small, which might affect the reliability of the connection between the camera lens 3 and the driver assembly 1, thereby affecting the zooming accuracy of the camera module. If the thickness of the non-metallic side wall is too small, the strength and rigidity of the lens barrel 2 are small, which affects the overall strength and rigidity of the camera module and affects the normal operation of the camera lens 3. Therefore, the thickness of the side wall made of the non-metallic material can be reasonably set by comprehensively taking the above two factors into accounts.

In an embodiment, all side walls of the lens barrel 2 may be made of the non-metallic material, and at the same time, all side walls of the lens barrel 2 have the same thickness.

In a first embodiment, both the magnetic portion 11 and the magnetic matching portion 14 are magnets, and an end of the magnetic portion 11 close to the magnetic matching portion 14 and an end of the magnetic matching portion 14 close to the magnetic portion 11 have opposite magnetic polarities. The magnetic portion 11 and the magnetic matching portion 14 may be permanent magnets, and can attract each other. For example, the end of the magnetic portion 11 close to the magnetic matching portion 14 is an N-pole, and the end of the magnetic matching portion 14 close to the magnetic portion 11 is an S-pole, so as to achieve the connection between the magnetic portion 11 and the magnetic matching portion 14, and thereby achieving the connection between the camera lens 3 and the driver assembly 1.

In a second embodiment, the magnetic portion 11 and the magnetic matching portion 14 are both electromagnets, that is, they are magnetic while being energized. At the same time, when the magnetic portion 11 and the magnetic matching portion 14 are energized, the end of the magnetic portion 11 close to the magnetic matching portion 14 and the end of the magnetic matching portion 14 close to the magnetic portion 11 have opposite magnetic polarities, so that the two can attract each other.

In a third embodiment, one of the magnetic portion 11 and the magnetic matching portion 14 is a magnet, and the other of the magnetic portion 11 and the magnetic matching portion 14 is a metal that can be attracted by the magnet. For example, the magnetic portion 11 is a magnet, and the magnetic matching portion 14 is an iron block (or a nickel block or a cobalt block). The iron block can be attracted by the magnet, so as to achieve the connection between the magnetic portion 11 and the magnetic matching portion 14, thereby achieving the connection between the camera lens 3 and the driver assembly 1.

In a fourth embodiment, one of the magnetic portion 11 and the magnetic matching portion 14 is an electromagnet, and the other of the magnetic portion 11 and the magnetic matching portion 14 is a metal that can be attracted by the electromagnet.

In an embodiment, along the radial direction of the lens barrel 2 (the direction perpendicular to the optical axis of the camera lens 3), the magnetic portion 11 and the magnetic matching portion 14 are correspondingly disposed, that is, along the radial direction of the lens barrel 2, at least a part of a projection of the magnetic portion 11 overlaps with a part of a projection of the magnetic matching portion 14.

In the embodiment, when the magnetic portion 11 and the magnetic matching portion 14 are arranged correspondingly, the magnetic attraction therebetween is relatively large, which can improve the reliability of the connection between the camera lens 3 and the driver assembly 1, thereby improving the accuracy and reliability of the camera module in zooming.

As shown in FIG. 3, along the radial direction of the lens barrel 2, the projection of the magnetic portion 11 can overlap with the projection of the magnetic matching portion 14. At this time, the magnetic attraction between the magnetic portion 11 and the magnetic matching portion 14 can be further improved, and volumes of the magnetic portion 11 and the magnetic matching portion 14 can be reduced, thereby reducing a volume of the camera module.

In an embodiment, as shown in FIG. 3, the camera lens 3 includes a lens 31 and a holding portion 32 configured to hold the lens 31. After the holding portion 32 holds the lens 31, the holding portion 32 is at least partially located in the lens barrel 2 and is movable in the lens barrel 2. In the present invention, a shape and a size of the inner cavity of the lens barrel 2 are not limited, and an overall shape and a structural form of the camera lens 3 are not limited either. For example, the lens may include a single lens or a lens group consisting of multiple lenses, and the single lens or the lens group can be first accommodated in a fixing member and then held by the holding portion 32 to form the camera lens 3. The shape and the structural form of the holding portion 32 are not limited, and a manner for assembling the holding portion 32 and the lens 31 is not limited either. The camera lens further comprises a spacer 33, the spacer 33 separates magnetic matching portion 14 from the lens barrel 2, and the spacer 33 connect with the lens barrel 2 by a curved surface. The spacer 33 make the magnetic matching portion 14 separates from the lens barrel 2 by an interval, so the friction between the magnetic is avoided, due to spacer 33 connect with the lens barrel 2 by a curved surface, the motion fluency is increased.

In an embodiment, at least a part of the holding portion 32 is made of a non-metallic material, and the magnetic matching portion 14 is mounted on the non-metallic part of the holding portion 32.

In an embodiment, as shown in FIGS. 1 and 2, the driver assembly 1 further includes a motor 12 and a transmission portion 13. The motor 12 is connected to the transmission portion 13. The transmission portion 13 is configured to be connected to the camera lens 3, so that the motor 12 and the transmission portion drive the camera lens 3 to move along the optical axis. The magnetic portion 11 is installed on the transmission portion 13.

In an embodiment, the motor 12 has an output shaft 121 that is rotatable, and the transmission portion 13 is connected to the output shaft 121. When the driver assembly 1 is operating, the output shaft 121 of the motor 12 rotates, and the transmission portion 13 is configured to convert a rotary motion of the output shaft 121 to a linear motion parallel with the optical axis, so that the magnetic portion 11 is driven by the transmission portion 13 to move linearly along the direction parallel with the optical axis, and then the magnetic attraction between the magnetic portion 11 and the magnetic matching portion 14 drives the holding portion 32 to move along the direction parallel with the optical axis in such a manner that the lens 31 moves along the optical axis, thereby achieving zooming. Therefore, the transmission portion 13 can be a linear motion mechanism, such as, a screw-slider mechanism, a gear-rack mechanism, or the like.

In an embodiment, the axial direction of the output shaft 121 is parallel with the optical axis of the camera lens 3, the output shaft 121 is provided with external threads 121a, and the transmission portion 13 is correspondingly provided with internal threads, so that the output shaft 121 and the transmission portion 13 are connected to each other through threads. During the rotation of the output shaft 121, the transmission portion 13 can be driven to move linearly along the axial direction of the output shaft 121, so that the rotary motion of the output shaft 121 is converted to a linear motion by the transmission portion 13.

In an embodiment, as shown in FIG. 1, the transmission portion 13 includes a first connection portion 131 and a second connection portion 132, the first connection portion 131 is used in mounting of the magnetic portion 11, and the second connection portion 132 is provided with internal threads to be connected to the output shaft 121 through threads. In an embodiment shown in FIG. 1, the transmission portion 13 has an L-shaped structure, that is, the first connection portion 131 and the second connection portion 132 are perpendicular to each other, and the second connection portion 132 is perpendicular to the output shaft 121 to facilitate the connection therebetween through threads. In addition, during the axial motion of the transmission portion 13 relative to the output shaft 121, a part of the output shaft 121 can extend into a space defined by the first connection portion 131 and the second connection portion 132.

In an embodiment of the present invention, the motor 12 is a stepper motor. The stepper motor is a motor configured to convert an electrical pulse signal to a corresponding angular displacement or linear displacement. Therefore, the angular displacement of the stepper motor can be adjusted by changing parameters of the stepper motor, thereby adjusting the linear movement distance of the transmission portion 13 based on the user's requirements and thus adjusting a focal length of the camera lens 3.

The above-described embodiments are merely preferred embodiments of the present invention, but not intended to limit the present invention. Various changes and modifications can be made to the present invention by those skilled in the art. Any modifications, equivalent substitutions and improvements within the principle of the present invention shall fall into the protection scope of the present invention.

What is claimed is:

1. A camera module, comprising:
    a lens group comprising a lens barrel and a camera lens, at least part of the camera lens being arranged in the lens barrel; and
    a driver assembly configured to drive the camera lens to move along an optical axis of the camera lens,
    wherein the driver assembly comprises a magnetic portion, the camera lens comprises a magnetic matching portion, and the magnetic portion and the magnetic matching portion are respectively located at two ends of a side wall of the lens barrel in a thickness direction; and the magnetic portion and the magnetic matching portion are connectable to each other through magnetic attraction, in such a manner that the camera lens is driven directly by the driver assembly to move along the optical axis of the camera lens;
    wherein the magnetic matching portion is separated from the lens barrel by an interval.

2. The camera module as described in claim 1, wherein the side wall of the lens barrel is free of a through hole;
    wherein the camera lens further comprises a spacer, the spacer separates the magnetic matching portion from the lens barrel, and the spacer connect with the lens barrel by a curved surface.

3. The camera module as described in claim 2, wherein a portion of the side wall of the lens barrel located between the magnetic portion and the magnetic matching portion is made of a non-metallic material.

4. The camera module as described in claim 3, wherein the portion of the side wall of the lens barrel located between the magnetic portion and the magnetic matching portion has a thickness ranging from 10 mm to 50 mm.

5. The camera module as described in claim 2, wherein each of the magnetic portion and the magnetic matching portion is a magnet, and an end of the magnetic portion close to the magnetic matching portion and an end of the magnetic matching portion close to the magnetic portion have opposite magnetic polarities.

6. The camera module as described in claim 2, wherein each of the magnetic portion and the magnetic matching portion is an electromagnet, and an end of the magnetic portion close to the magnetic matching portion and an end of the magnetic matching portion close to the magnetic portion have opposite magnetic polarities while being energized.

7. The camera module as described in claim 2, wherein the magnetic matching portion is made of a metal material and is capable of being attracted by the magnetic portion.

8. The camera module as described in claim 2, wherein the camera lens comprises a lens and a holding portion configured to hold the lens, and at least a part of the holding portion is located in the lens barrel, and
    wherein the holding portion is made of a non-metallic material, and is movable in the lens barrel, and the magnetic matching portion is arranged on the holding portion.

9. The camera module as described in claim 2, wherein the driver assembly further comprises a motor and a transmission portion, the transmission portion is configured to be connected to the camera lens, and the magnetic portion is installed on the camera lens; and wherein the motor is configured to drive the transmission portion to move along a direction parallel with the optical axis of the camera lens.

10. An electronic device having an image-capturing function, comprising:

a housing; and a camera module installed in the housing, wherein the camera module comprises:

a lens group comprising a lens barrel and a camera lens, at least part of the camera lens being arranged in the lens barrel; and a driver assembly configured to drive the camera lens to move along an optical axis of the camera lens, wherein the driver assembly comprises a magnetic portion, the camera lens comprises a magnetic matching portion, and the magnetic portion and the magnetic matching portion are respectively located at two ends of a side wall of the lens barrel in a thickness direction; and the magnetic portion and the magnetic matching portion are connectable to each other through magnetic attraction, in such a manner that the camera lens is driven directly by the driver assembly to move along the optical axis of the camera lens;

wherein the magnetic matching portion is separated from the lens barrel by an interval.

11. The electronic device as described in claim 10, wherein the side wall of the lens barrel is free of a through hole;

wherein the camera lens further comprises a spacer, the spacer separates the magnetic matching portion from the lens barrel, and the spacer connect with the lens barrel by a curved surface.

12. The electronic device as described in claim 11, wherein a portion of the side wall of the lens barrel located between the magnetic portion and the magnetic matching portion is made of a non-metallic material.

13. The electronic device as described in claim 12, wherein the portion of the side wall of the lens barrel located between the magnetic portion and the magnetic matching portion has a thickness ranging from 10 mm to 50 mm.

14. The electronic device as described in claim 11, wherein each of the magnetic portion and the magnetic matching portion is a magnet, and an end of the magnetic portion close to the magnetic matching portion and an end of the magnetic matching portion close to the magnetic portion have opposite magnetic polarities.

15. The electronic device as described in claim 11, wherein each of the magnetic portion and the magnetic matching portion is an electromagnet, and an end of the magnetic portion close to the magnetic matching portion and an end of the magnetic matching portion close to the magnetic portion have opposite magnetic polarities while being energized.

16. The electronic device as described in claim 11, wherein the magnetic matching portion is made of a metal material and is capable of being attracted by the magnetic portion.

17. The electronic device as described in claim 11, wherein the camera lens comprises a lens and a holding portion configured to hold the lens, and at least a part of the holding portion is located in the lens barrel, and wherein the holding portion is made of a non-metallic material, and is movable in the lens barrel, and the magnetic matching portion is arranged on the holding portion.

18. The electronic device as described in claim 11, wherein the driver assembly further comprises a motor and a transmission portion, the transmission portion is configured to be connected to the camera lens, and the magnetic portion is installed on the camera lens; and wherein the motor is configured to drive the transmission portion to move along a direction parallel with the optical axis of the camera lens.

* * * * *